United States Patent
Kimiya et al.

[11] Patent Number: 6,013,390
[45] Date of Patent: Jan. 11, 2000

[54] ALKALINE STORAGE BATTERY

[75] Inventors: Hirokazu Kimiya, Kyoto; Hidekatsu Izumi, Neyagawa; Youichi Izumi, Moriguchi; Hiroyuki Sakamoto, Neyagawa; Akihiro Maeda, Kobe; Isao Matsumoto, Osaka, all of Japan

[73] Assignee: Matsushita Electric Industrial Co., Ltd., Osaka-Fu, Japan

[21] Appl. No.: 08/925,419

[22] Filed: Sep. 8, 1997

[30] Foreign Application Priority Data

Apr. 1, 1997 [JP] Japan ................................ 9-083038

[51] Int. Cl.⁷ .................................................. H01M 4/32
[52] U.S. Cl. ........................................ 429/206; 429/223
[58] Field of Search ..................................... 429/206, 223

[56] References Cited

U.S. PATENT DOCUMENTS

| | | | |
|---|---|---|---|
| 4,251,603 | 2/1981 | Matsumoto et al. . | |
| 4,898,794 | 2/1990 | Doi et al. . | |
| 4,983,474 | 1/1991 | Doi et al. . | |
| 5,079,110 | 1/1992 | Nakahori et al. . | |
| 5,281,494 | 1/1994 | Ettel et al. ............................... | 429/223 |
| 5,344,728 | 9/1994 | Ovshinsky et al. ...................... | 429/223 |
| 5,348,822 | 9/1994 | Ovshinsky et al. . | |
| 5,366,831 | 11/1994 | Watada et al. . | |
| 5,466,543 | 11/1995 | Ikoma et al. ............................. | 429/59 |
| 5,501,917 | 3/1996 | Hong . | |
| 5,506,076 | 4/1996 | Miyamoto et al. ...................... | 429/223 |
| 5,508,121 | 4/1996 | Sawa ........................................ | 429/59 |
| 5,523,182 | 6/1996 | Ovshinsky et al. ...................... | 429/223 |
| 5,549,992 | 8/1996 | Iwane et al. .............................. | 429/223 |
| 5,567,549 | 10/1996 | Ovshinsky et al. ...................... | 429/223 |
| 5,569,562 | 10/1996 | Glemser et al. ......................... | 429/223 |
| 5,569,563 | 10/1996 | Ovshinsky et al. ...................... | 429/223 |
| 5,635,313 | 6/1997 | Abe .......................................... | 429/223 |
| 5,660,952 | 8/1997 | Yano et al. ............................... | 429/223 |
| 5,670,271 | 9/1997 | Axmann ................................... | 429/59 |
| 5,681,673 | 10/1997 | Hattori et al. ........................... | 429/235 |
| 5,700,596 | 12/1997 | Ikoma et al. ............................. | 429/206 |

FOREIGN PATENT DOCUMENTS

| | | |
|---|---|---|
| 0 696 076 | 2/1996 | European Pat. Off. . |
| 0738 017 | 10/1996 | European Pat. Off. . |
| 43 23 007 A1 | 1/1995 | Germany . |

(List continued on next page.)

OTHER PUBLICATIONS

P. Oliva, et al., "Review of the Structure and the Electrochemistry of Nickel Hydroxides and Oxy–Hydroxides", *Journal of Power sources*, vol. 8, pp. 229–255 (1982). (Month N/A).

Edited by T. Keily, et al., "Power Sources 12", Proceedings: 16th International Power Sources Symposium, 1988. (Month N/A).

E. J. Rubin, et al., "A Correlation of the Solution Properties and the Electrochemical Behavior of the Nickel Hydroxide Electrode in Binary Aqueous Alkali Hydroxides", J. Electrochem. Soc.: Electrochem, Sci., vol. 118, No. 3, pp. 428–433 (Mar. 1971).

David Linden, ed., *The Handbook of Batteries and Fuel Cells*, §§16.2, 17.3.4, 18.2, 20.3.1, 22.2.1 and 22.2.2, (1984). Month N/A).

*Primary Examiner*—Maria Nuzzolillo
*Assistant Examiner*—Angela J. Martin
*Attorney, Agent, or Firm*—Akin, Gump, Strauss, Hauer & Feld, L.L.P.

[57] ABSTRACT

Disclosed is a sealed alkaline storage battery with an increased utilization of a positive electrode active material comprising a nickel oxide and with drastically enhanced capacity density. The positive electrode active material is a nickel based multi-metals oxide containing at least one element such as Mn which promotes the formation of γ phase during charging. The ratio $A_\gamma/A_\beta$ of the integrated intensity $A_\gamma$ of the diffraction peak at d=about 7 angstroms attributed to the γ phase to the integrated intensity $A_\gamma$ of the diffraction peak at d=about 4.5 to 5.0 angstroms attributed to the β phase of the oxide in the completely charged state is not smaller than 0.4. The electrolyte comprises an aqueous solution containing at least one of $K^+$ and $Na^+$ as a cationic component and the total concentration of the above-mentioned cationic component in the completely charged state is within a range between 4 and 12 mol/l.

27 Claims, 5 Drawing Sheets

FOREIGN PATENT DOCUMENTS

| | | |
|---|---|---|
| 51-122737 | 10/1976 | Japan . |
| 59-068168 | 4/1984 | Japan . |
| 61-037733 | 8/1986 | Japan . |
| 62-237667 | 10/1987 | Japan . |
| 62-054235 | 11/1987 | Japan . |
| 63-152866 | 6/1988 | Japan . |
| 3-026903 | 4/1991 | Japan . |
| 3-093161 | 4/1991 | Japan . |
| 3-050384 | 8/1991 | Japan . |
| 4-094058 | 3/1992 | Japan . |
| 4-080513 | 12/1992 | Japan . |
| 5-021064 | 1/1993 | Japan . |
| 5-028992 | 2/1993 | Japan . |
| 5-144467A | 6/1993 | Japan . |
| 6-45002 | 2/1994 | Japan . |
| 6-283195 | 10/1994 | Japan . |
| 7-014578 | 1/1995 | Japan . |
| 7-073876 | 3/1995 | Japan . |
| 7-335214 | 12/1995 | Japan . |
| 8-222215 | 8/1996 | Japan . |
| 9-050805 | 2/1997 | Japan . |
| 9-115543 | 2/1997 | Japan . |
| 9-082319 | 8/1997 | Japan . |
| WO 94/11910 | 5/1994 | WIPO . |

ALKALINE STORAGE BATTERY

BACKGROUND OF THE INVENTION

The present invention relates to an improvement of alkaline storage batteries such as nickel-cadmium storage battery, nickel-metal hydride storage battery and the like which have a nickel electrode.

In recent years, alkaline storage batteries, especially small-size sealed type batteries, have been used extensively as a main power source for various kinds of portable equipment including communication apparatuses, business machines, home electric appliances, sundry goods, etc. because of their balanced advantages over other battery systems in charge and discharge characteristics, cycle life, safety and reliability. Also, because they have very excellent charge and discharge characteristics and reliability, alkaline storage batteries attract attention as a large power source, a mobile main power source for electric vehicles, for example.

The storage battery system industrially representing those alkaline storage batteries is the nickel-cadmium storage battery which has a long history. Recently, the nickel-metal hydride storage battery in which a metal hydride is used in place of the cadmium negative electrode of the storage battery has been industrialized and is fast growing in market share because of the strength of its high energy density.

As has been attempted in the past, to improve such energy density and reliability, extremely important is: (1) to make lighter, thinner, shorter and smaller the supporting member and additives in the electrode, separator, battery case and lid and others so as to allow the packing of a large amount of active materials of the positive and negative electrodes in a certain volume; (2) to develop a new active material that displays a high energy density under various application conditions; and (3) to improve additives, conductive materials, etc. to raise the utilization of the active material. So, the recent technical trends of these are hereinafter described.

In the positive electrode in the alkaline storage battery, the main active material is a nickel oxide (NiOOH) which has been long used and not changed, but the traditional sintered plaque as a substrate of the electrode has begun to be replaced by the network substrate with a higher porosity such as, for example, a foamed nickel substrate. As a result, an electrode with a large amount of active material powder filled in the foamed nickel substrate has been industrialized which has remarkably improved the energy density of the positive nickel electrode (Japanese Published Patent Sho 62-54235, U.S. Pat. No. 4,251,603). The industrialization of an electrode with a nickel felt as a substrate is also reported which has the same characteristics as the foamed nickel substrate.

The common advantage in application of these high-porosity substrates is that a simple manufacturing process can be used; because the pore size can be made large unlike the conventional micro-porosity sintered plaque, nickel oxide in the form of paste can be directly filled into the substrate. But, a powder of large particle size is filled into the substrate which has a much large pore size than that of the sintered plaque. This causes a decrease in electric conduction between the active material powders and the substrate, or between the active material powders, which in addition to the decrease in electronic conductivity of the whole electrode plate supporting the active material powder, has a marked influence, and induces decreased utilization of the active material. So, the conductivity has been compensated by adding Co, its oxide or nickel etc. to the active material powder, and the still insufficient conductivity has been made up by incorporating metallic elements other than Ni, such as Co, etc. into the nickel oxide to form a solid solution.

It was found that the incorporation into the nickel oxide of other elements in a solid solution state is markedly effective in improving charging efficiency and that the incorporation of two elements Co and Cd especially has a remarkable effect, particularly. Then, Zn, which resembles Cd in characteristics, has drawn attention and is used as a substitute element for Cd, and also a solid solution having three elements Co, Zn and Ba incorporated therein is proposed. Such incorporation into nickel oxide of other elements in a solid solution state for the purpose of raising the efficiency of discharge characteristics is an old-established technology as far as the non-sintered type electrode is concerned, and improved examples are cited which are achieved by using a solid solution nickel oxide incorporated with one element selected from among Mg, Ca, Ba, Ti, Zr, Mn, Co, Fe, Cu, Sc, Y, etc.

The incorporation into nickel oxide of such elements as Co, Cd, Zn, etc. in a solid solution state is effective in not only improving charging efficiency but also inhibiting the formation of a highly oxidized compound, that is, nickel oxyhydroxide of the $\gamma$ type. Therefore, the incorporation of the above-mentioned elements, which keep down the volume swelling of nickel oxide, is an effective way to lengthen the cycle life if it is used in brittle, foamed metal-type electrode, etc.

In parallel with the improvement from the material side of active material, the shape of the active material powder has been improved into a sphere which is suitable for high density packing and has begun to be used in storage batteries for practical use.

The method of adding the above-mentioned Co and other oxides has been further improved. The following methods have been proposed; a way of forming a covering layer of $Co(OH)_2$ on the surface of an active material powder and a way of forming a powder layer of Co oxide. Any of those aims at achieving a high-efficiency utilization and improved productivity of the active material by realizing an efficient method of adding the conductive agent.

As a result of such a technological progress, the charging efficiency of the active material packed in a density far larger than before could be raised to the same level as that of an excellent sintered-type electrode, and the energy density of the positive electrode has drastically improved. A positive nickel electrode with an energy density of 600 mAh/cm$^3$ or so is now put to practical use.

In the negative electrode, meanwhile, the energy density has greatly increased as a high capacity density metal hydride ($AB_5$ type) has begun to be used in storage batteries in place of the conventional cadmium negative electrode, and a negative electrode has now been commercialized that has twice or more as large an energy density per unit volume as the positive electrode. Thickness reduction of the separator and component parts related to the battery case progressed rapidly, with the steady increase in the energy density of the storage battery.

However, as indicated above, the call has been increasingly growing in recent years for improvement of energy density as the power source for portable equipment. To achieve further improvement of storage battery energy density in answer to this call, there is a strong demand for still higher energy density and efficiency especially in the positive electrode in association with the development of technology for the negative electrode with high energy density.

Viewed from the aspect of recent uses, in addition to request for long cycle life and safety, there is a stronger call for high energy density over a wider temperature range than before, especially at high temperatures between 40 and 60° C. or so with diversification of application conditions of portable electronic equipment where the storage battery is used as a power source. This is also the case with a large, mobile power source of which the size and weight reduction is called for under vigorous operating and environmental conditions.

As a positive electrode active material for alkaline storage batteries in industrial application, now used is a material based on nickel oxide ($Ni(OH)_2$). The charging and discharging reaction, as shown hereinafter, is said to be mainly a one-electron reaction of Ni between bivalent and trivalent among the crystals of β-Ni $(OH)_2$ phase (β (bivalent) phase) and β-NiOOH phase (β (trivalent) phase).

In actual storage batteries, however, it seems that the reaction occurs between about 2.2 valent and about 3.2 valent (in this case, it is often referred to as a reaction of β-Ni$(OH)_2$ phase and β-NiOOH phase). Anyway, it is a reaction equivalent to approximately one electron. With regard to β-NiOOH in charged state, if the charging is conducted in a low temperature environment or charging is conducted for a long period of time, or usual overcharging is repeated, a part thereof is oxidized to form γ-NiOOH having a higher Ni oxidation state. When it is oxidized to form γ-NiOOH, the volume swells, and the electrode becomes liable to swell. γ-NiOOH is an electrochemically inert material. On this ground, there are such drawbacks as decreased capacity and lowered battery voltage during discharge with the rise of overvoltage due to γ-NiOOH formation. So, various measures to suppress the formation of γ-NiOOH have been taken in the past.

It is noted that γ-NiOOH is represented by the formula $A_xH_yNiO_2.nH_2O$ in which an alkali metal A is intercalated between the layers composed of Ni and O, thereby to balance a charge between A, H, Ni and O. And the mean valence of Ni is 3.3 to 3.8, and, in the concrete, such values as 3.67 and 3.75 are reported (J. Power Sources 8, p. 229 (1982)). γ-NiOOH$_2$ is known as a higher oxide compound that indicates a non-stoichiometric valence.

Contrary to that, a number of studies have been made from a viewpoint that to achieve a still higher energy density using a material based on a nickel oxide as the active material for secondary batteries, it is necessary to make a good use of this γ-NiOOH.

From the active material side, for example, there are reported methods of making, from the start, a nickel based hydroxide having an interlayer distance of about 8 angstroms (which resembles theγ type having an interlayer distance of about 7 angstroms but is in a discharged state and often called α-Ni$(OH)_2$ phase (hereinafter referred to as α phase) by incorporating a higher oxidized compound forming element such as Mn, Fe, etc. into a nickel oxide so as to form positively charged metal oxide layers, and then incorporating anions between the metal oxide layers for overall charge balance (Solid State Ionics 32/33, p. 104 (1989), J. Power Sources, 35, p.294 (1991), U.S. Pat. No. 5,348,822 etc.).

Though such oxides are readily charged into a higher oxidized nickel oxide thereby increasing the discharging reaction valence, the material density of the material itself falls extremely, because an a phase having a wide interlayer distance is present. Also, if an α phase recognizable on an X-ray diffraction is present, it will hinder the crystal particle from growing in a high density in the precipitation reaction. Thus, there arises a problem that the tap density of the oxide powder falls greatly. Since the tap density has a positive correlation with the filling density in making an electrode, it will be very difficult to fill an active material in a high density if the tap density drops sharply. From the view of achieving a high energy density, such decrease in tap density is quite a serious problem. This decreases the energy density of the electrode, and the practicability of the electrode is very low.

In the meantime, considerable researches have been conducted from the aspect of electrolyte concentration. In the past, an electrolyte having a specific gravity of 1.2 to 1.3 or so, that is, one which includes an aqueous solution of KOH as a main component containing KOH or NaOH corresponding to 6 to 7N has been generally used in many cases. More specifically, in the nickel-metal hydride storage battery, for example, a 5N–KOH+1N–LiOH aqueous solution (Phillips J. Res. 39 Suppl. No. 1, p. 1), 7N–KOH+0.5N–LiOH (Power Source 12, p. 203 (1988)), etc. and in the nickel-cadmium storage battery which forms $H_2O$ in charging, one with 15 to 45 g/l of LiOH.$H_2O$ added to an aqueous solution of KOH having a little higher specific gravity than that, that is, 1.27 to 1.35 (Japanese Laid-Open Patent Sho 60-124368) have been used as an electrolyte.

In this connection, the idea has long been proposed that γ-NiOOH is made to be formed efficiently thereby raising the utilization of the active material, by raising the concentration of the electrolyte. In the nickel-cadmium storage battery, for example, an idea is presented that γ-NiOOH is made to be efficiently formed by setting the concentration of an electrolyte in the formation to 10N so as to raise the utilization of the active material (Japanese Laid-Open Patent Hei 5-144467). More ideas are disclosed, including one in which an electrolyte with the concentration of KOH and LiOH adjusted to 35 to 39 weight percent is used in the nickel-metal hydride storage battery having a positive electrode made up of 85 to 98 weight percent of $Ni(OH)_2$, 1 to 7 weight percent of CoO and 1 to 7 weight percent of ZnO (Japanese Laid-Open Patent Hei 6-283195) and another in which the specific gravity of an electrolyte consisting of KOH, NaOH and LiOH is set to 1.31 to 1.4 (Japanese Laid-Open Patent. Hei 6-45002).

However, the active materials used in those ideas were $Ni(OH)_2$ which form an inert γ-NiOOH that does not discharge until a battery voltage of 1.0 V or one that is so improved as to control γ-NiOOH as mentioned earlier. Therefore, the formation of γ-NiOOH which discharges under the voltage of the battery in service is low, and they have not been an effective way to raise the utilization of the active material.

γ-NiOOH was considered to be inert. But it has been found that with some elements incorporated in a solid solution state, even with a nickel hydroxide of the β (bivalent) phase suitable for high density filling in an uncharged state, a γ-NiOOH phase (hereinafter called γ phase) is formed during charging, and this is ready to discharge under the voltage range of the commonly used storage battery and returns to nickel hydroxide of the β (bivalent) phase. Such an active material has a high density which is advantageous in making an electrode, and in discharging and charging, furthermore, the higher oxidized compound γ phase is utilized. Therefore, the use of such an active material is extremely effective in raising the energy density. In achieving a high efficiency under various service conditions as required recently, it is considered to be effective to incorporate nickel oxide with an element in a solid solution state that raises the charging efficiency of the positive electrode at a high temperature. In the incorporation into nickel oxide of an element for raising the charging efficiency at a high temperature, too, measures are taken by creating a solid solution on the surface layer of the nickel oxide so as to minimize the decrease of the content of Ni, the main component responsible for oxidation-reduction reaction in the active material, thereby raising the energy density of the positive electrode. At any rate, to realize an efficient use of nickel oxide of the γ type is the main way to achieve a high energy density.

However, the electrode using such a newly developed material was found to have a problem that under the conditions where the quantity of the electrolyte is limited as in the sealed battery, the utilization of the active material is some 10 to 25 percent lower than that attained when the electrolyte is used enough and abundantly for the capacity. This decrease in utilization of the active material has been a serious obstacle in providing an alkaline storage battery with a high energy density and high efficiency under the conditions where the quantity of the electrolyte is limited.

BRIEF SUMMARY OF THE INVENTION

The present invention provides an alkaline storage battery comprising a positive electrode having as a main material an active material of a nickel based multi-metals oxide containing at least one element selected from the group consisting of Mn, Al, Co, Cr, Fe, Zr and Bi, a negative electrode, a separator and 1.0 to 2.7 ml of an alkaline electrolyte per Ah of the positive electrode capacity, wherein the nickel based multi-metals oxide in its completely charged state has a γ phase having a diffraction peak at an interlayer spacing d of about 7 angstroms in the powder X-ray diffraction, the ratio $A_\gamma/A_\beta$ of the integrated intensity $A_\gamma$ of the diffraction peak at d=about 7 angstroms attributed to the γ phase to the integrated intensity $A_\beta$ of the diffraction peak at about d=4.5 to 5.0 angstroms attributed to the β phase of said nickel based multi-metals oxide in its completely charged state is not smaller than 0.4, the electrolyte comprises an aqueous solution containing at least one of $K^+$ and $Na^+$ as a cationic component, and the total concentration of the above-mentioned cationic component in the electrolyte in the completely charged state is within a range between 4 and 12 mol/l.

The present invention also provides an alkaline storage battery comprising a positive electrode having as a main material an active material of a nickel based multi-metals oxide containing at least one element selected from the group consisting of Mn, Al, Co, Cr, Fe, Zr and Bi, a negative electrode, a separator and 1.0 to 2.7 ml of an alkaline electrolyte per Ah of the positive electrode capacity, wherein the nickel based multi-metals oxide in its completely charged state has a γ phase having a diffraction peak at d=about 7 angstroms in the powder X-ray diffraction, the ratio $A_\gamma/A_\beta$ of the integrated intensity $A_\gamma$ of the diffraction peak at d=about 7 angstroms attributed to the γ phase to the integrated intensity $A_\beta$ of the diffraction peak at d=about 4.5 to 5.0 angstroms attributed to the β phase of said nickel based multi-metals oxide in its completely charged state is not smaller than 0.4, the electrolyte comprises an aqueous solution containing at least one of $K^+$ and $Na^+$ as a cationic component, and the total concentration of the above-mentioned cationic component in the electrolyte in the completely discharged state is within a range between 8 and 14 mol/l.

The completely charged state here means the standard charged state defined in JIS-C8705, that is, the state after charging is conducted at a constant current of 0.1 CmA for 15 hours, while the completely discharged state represents the state after discharging is continued at a constant current of 0.2 CmA until the battery voltage decreases to 1.0 V.

Another aspect of the present invention is an alkaline storage battery comprising a positive electrode having as a main material an active material of a nickel based multi-metals oxide containing at least one element selected from the group consisting of Mn, Al, Co, Cr, Fe, Zr and Bi, a negative electrode, a separator and 1.0 to 2.7 ml of an alkaline electrolyte per Ah of the positive electrode capacity, wherein the alkaline electrolyte comprises an aqueous solution containing at least one of $K^+$ and $Na^+$ as a cationic component, and the total concentration of the above-mentioned cationic component in the electrolyte in the completely charged state and/or in the completely discharged state is within the above-specified range.

In a preferable mode of the present invention, the above-mentioned electrolyte contains $K^+$ and $Na^+$, and the content of $Na^+$ is between 10 and 60 mol % of the total concentration of $K^+$ and $Na^+$ in the electrolyte.

In another preferable mode of the present invention, the electrolyte contains 0.02 to 1 mol/l of at least one selected from the group consisting of $Li^+$, $Rb^+$ and $Cs^+$.

Furthermore, the above-mentioned nickel based multi-metals oxide contains preferably at least one element selected from the group consisting of Ca, Mg, Y, V, Cu, Ge, Zr, Nb, Mo, Ag, Zn, Cd, Sn, Sb, W and lanthanoids.

It is also preferable that the above-mentioned nickel based multi-metals oxide has a BET specific surface area of 5 to 50 $m^2/g$.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The present invention, as indicated above, uses a nickel oxide as a positive electrode material which produces much γ-NiOOH phase during charging, such as nickel based multi-metals oxide with Mn incorporated therein. In putting to practical use a sealed battery using this positive electrode, the following improvements were made:

(1) The reaction in solid state between $\beta$-Ni(OH)$_2$ and $\beta$-NiOOH is represented by the following formula. And the electrolyte plays mainly the role as a medium in the movement of electric charge, and would not change in quantity and composition.

On the other hand, the reaction in which $\gamma$-NiOOH is formed is represented by the following formula. In this reaction, alkali ions in the electrolyte, especially K$^+$, Na$^+$, and H$_2$O, are intercalated between metal-oxygen layers, whereby the quantity and concentration of the electrolyte change.

Here, $\gamma$-NiOOH is represented by the formula A$_x$NiOOH$_y$·nH$_2$O (x<1, y<1). For pure Ni(OH)$_2$, such intercalation of alkali ions into $\gamma$-NiOOH has been well known. In the aforementioned J. Power Sources 8, p 229 (1982), for example, x=0.23 or 0.32 is given as the quantity of alkali metal ions in $\gamma$-NiOOH. Also, it is indicated that the quantity of H$_2$O is n=0.25, 0.67, but there are also many studies describing it as unknown. From the crystal structure, however, it is estimated as n<1.2.

Such a positive electrode active material forming much higher oxidized compound that fast discharges within the range of the battery voltage can be obtained by incorporating Ni(OH)$_2$ with at least one element selected from the group consisting of Mn, Al, Co, Cr, Fe, Zr and Bi in a solid solution state.

In the meantime, the alkaline storage battery is designed to control the battery capacity depending on the capacity of the positive electrode for protection against overcharging and overdischarging. In recent years, the percentage of the space occupied by the positive and negative electrodes in the battery case is increased to a maximum to answer a demand for an improvement of capacity density, and it is considered appropriate that the electrolyte should be no more than 2.7 ml per rated capacity of 1 Ah.

Here, the rated capacity is defined by JIS-C8705 as the reference value representing the storage battery capacity and as the capacity indicated on the storage battery. In practice, however, the value worked out by a statistical analysis from the actual capacity measured in standard charging and discharging using a theoretical capacity as reference, on the basis of one electron reaction of Ni, is used in many cases. In the present invention, too, the rated capacity is determined in compliance with that. But the utilization is expressed, as in the past, in percentage of actual discharge capacity to the theoretical capacity based on one electron reaction between $\beta$-Ni(OH)$_2$ and $\beta$-NiOOH. The depth of charge was also expressed based on the above reaction.

The charging efficiency of the positive electrode depends on the type of the active material used, the depth of charging and the concentration of the electrolyte. It falls when the depth of charging enters the region where $\gamma$ phase is formed (in many cases, the depth of charging is not lower than 90%) accompanying oxygen gas evolution.

The charging efficiency varies a great deal by the type of the active materials. In the conventional positive electrode material where the formation of $\gamma$ phase is suppressed to the minimum, the charging efficiency is nearly zero in that area, i.e., most of the current is used for oxygen evolution reaction. While in the case of the materials which form much $\gamma$ phase, especially when a positive electrode material modified as shown above is used, the charging efficiency gradually decreases to zero along with the depth of charging in the region where $\gamma$ phase is formed.

If the same active material is used, the concentration of the electrolyte is closely related to the formation of $\gamma$ phase; the higher the concentration of the electrolyte, the easier the formation of $\gamma$ phase. That is, the charging efficiency is high and the decrease in charging efficiency with the depth of charging is moderate. There are more or less differences by the nickel oxides used, but the alkali concentration in the electrolyte is not higher than 4 mol/l, the charging efficiency sharply falls upon entry into the region of $\gamma$ phase, and charging will hardly take place even if power is further applied.

In a system where the quantity of the electrolyte is limited as in the sealed cell, $\gamma$ phase forms with the rise of the charging depth, consuming alkali cations (mainly K$^+$ and Na$^+$) and H$_2$O in the electrolyte. And, because the decrease of alkali ions is large, the concentration of the electrolyte decreases, which causes a larger drop of the charging efficiency as compared with the case where the quantity of electrolyte is enough. If the concentration of alkali cations drops below 4 mol/l, charging will not proceed any more. In such a state where charging hardly takes place, if power is further applied, the generation of oxygen from the positive electrode will be excessive, raising the internal pressure of the battery, which can cause leakage of the electrolyte. Therefore, it is important to optimize the positive electrode material and the quantity and concentration of the electrolyte so that the concentration of alkali cations (mainly K$^+$ and Na$^+$) is kept not lower than 4 mol/l.

The sealed type battery in which high energy efficiency is achieved as discussed earlier has no space to increase the quantity of electrolyte to the full. From this, it follows that it is beneficial to use an electrolyte of a high concentration for positive electrodes which produces much $\gamma$-NiOOH, especially one with a high capacity density. The inventors discovered that if the ratio A$_\gamma$/A$_\beta$ of the integrated intensity A$_\gamma$ of the diffraction peak at d=about 7 angstroms attributed to the $\gamma$ phase formed in the nickel oxide to the integrated intensity A$_\beta$ of the diffraction peak at d=about 4.5 to 5.0 angstroms attributed to the $\beta$ phase of the nickel oxide in the completely charged state is not lower than 0.4, the concentration of K$^+$, Na$^+$ in such an electrolyte drops sharply and that the use of highly concentrated electrolyte is quite effective. That is because the integrated intensity of X-ray diffraction peak corresponds to the quantity of each phase, and the higher the ratio A$_\gamma$/A$_\beta$ is, the larger the quantity of $\gamma$ phase is and the higher the utilization of the active material is. Though more of less different depending on the nickel oxide used, it is estimated that with A$_\gamma$/A$_\beta$ at about 0.4, $\gamma$ phase is some 10% formed. This value is the quantity to cause such a change in the concentration of the electrolyte as to begin to affect the charging efficiency when the quantity of the electrolyte is limited.

If such a positive electrode material forming much $\gamma$-NiOOH that readily discharges within the range of the battery voltage is combined with a highly concentrated electrolyte, the formation of $\gamma$-NiOOH will be so effectively promoted that the storage battery with a limited quantity of the electrolyte can turn to one with a high energy density.

However, if the concentration of the electrolyte used is too high, a part of γ phase formed will become inert, and the utilization will fall instead when the depth of charging rises. Even in such a case, the utilization of the active material is higher than that of the conventional active material, but as the charging-discharging cycle is repeated, inert γ phase will accumulate, which leads to shortening of the cycle life. Therefore, it is desirable that the concentration of the electrolyte should be kept at an optimum level in any state of charging depth.

The above indicates that it would be best to design a storage battery in such a way that the concentration of the electrolyte both in the completely charged and discharged states is within the optimum range, since the utilization of active materials can be maximized when the concentration of the electrolyte in the completely charged or discharged state is within the optimum range.

It is noted that some reports have indicated that the formation rate of γ-NiOOH can be increased by raising the concentration of the electrolyte in the past, but they were not ones attempting to improve the energy density of the storage battery with a limited quantity of electrolyte by combining a positive electrode that readily forms γ-NiOOH with an electrolyte in an optimum concentration.

(2) As the negative electrode, the conventional hydrogen storage alloy electrode, the cadmium electrode, etc. can be employed in the present invention. The hydrogen storage alloy negative electrode absorbs and releases hydrogen desorbed from the positive electrode via the electrolyte as represented by the following formula, without increase or decrease of the electrolyte.

The cadmium negative electrode, on the other hand, forms water in charging during the following reaction, and is accompanied by the decrease in concentration of the electrolyte.

Even with a negative electrode accompanied by the formation of water, there will be no change in the relation between the concentration of the electrolyte and the charging efficiency of the positive electrode as mentioned earlier. Therefore, the raising effect on the utilization of the active material or capacity density by increasing the concentration of the electrolyte is unchanged. In this case, however, it is necessary to design a storage battery by taking into consideration the formation of water in charging so as to set the concentration of the electrolyte in the completely charged state. In the nickel-cadmium storage battery, therefore, it is necessary to use the electrolyte at a higher concentration than in the nickel-metal hydride storage battery.

If all of these are considered, the optimum value of the electrolyte or the total concentration of $K^+$ and $Na^+$ in the nickel-metal hydride storage battery is 4 to 12 mol/l in the completely charged state and 8 to 13 mol/l in the completely discharged state. In the nickel-cadmium storage battery, it is 4.5 to 10 mol/l in the completely charged state and 8 to 14 mol/l in the completely discharged state.

In summary, the active material utilization of the sealed type alkaline storage battery using a nickel oxide as the positive electrode active material, in which the nickel oxide forms γ phase in charging, can be enhanced by adjusting the total concentration of $K^+$ and $Na^+$ at 4 to 12 mol/l in the completely charged state and/or 8 to 14 mol/l in the completely discharged state.

(3) As the alkali cation for use in the electrolyte, $K^+$, $Li^+$, $Na^+$ are generally used, and $Rb^+$, $Cs^+$, etc. also have been studied. Of those, ones that are effective in enhancing the formation of γ phase should be chiefly used. In the case of $Ni(OH)_2$ which is not incorporated with any metallic element other than Ni in a solid solution state, the effect is the strongest with an electrolyte containing $K^+$, and when $Na^+$ and $Li^+$ are used, the formation rate of γ-NiOOH is low. But even if $K^+$ is used, some part of γ-NiOOH will not discharge until the battery voltage decreases to about 0.8 V.

However, in the case of $Ni(OH)_2$ with any of Mn, Al, Co, Cr and Fe incorporated therein, not only $K^+$ but also $Na^+$ is effective in enhancing the formation of a higher oxidized compound of γ phase that discharges at a battery voltage of not lower than 1.0 V. Therefore, it is appropriate to use at least either $K^+$ or $Na^+$ as the alkali cation. Here, if the electric conductivity of the electrolyte is considered, it is advantageous to use the higher electric conductivity of KOH solution. Also, if $Na^+$ is used in a large quantity, γ-NiOOH formed is liable to become inert, lowering the charge and discharge characteristics instead. But the use of $Na^+$ can improve the charging efficiency at a high temperature in particular, and it is important to optimize the content of $Na^+$. The optimum content of $Na^+$ ranges between 10 and 60 mol % of the quantity of $K^+$ and $Na^+$ cations in the electrolyte.

With the addition of $Li^+$, $Ni(OH)_2$ has improved charging efficiency at a high temperature. The positive electrode active material of the present invention also has increased charging efficiency in a high temperature atmosphere if $Li^+$ is added. But an excessive addition of $Li^+$ can be a factor to decrease the capacity, because $Li^+$ suppresses the formation of γ phase. $Rb^+$ and $Cs^+$ enhance the formation of γ phase, but because of the large ion radius, they do not move well in a solid, and too much addition causes the active material to become inert. Therefore, the optimum quantity ranges from 0.02 to 1 mol/l.

In preparation of the above-mentioned electrolyte, at least one selected from alkali metal neutral salts and fluorides may be added, in addition to a predetermined alkali metal hydroxide. The presence of such salt in the electrolyte suppresses dissolution of the negative electrode material, particularly the hydrogen storage alloy and improves the cycle life characteristic of the battery.

Preferred alkali metal neutral salts are ones selected from the group consisting of carbonates, nitrates, sulfates, thiosulfates and acetates, exemplified as $K_3PO_4$, $CH_3COOK$, $Na_2S_2O_3$, $Li_2SO_4$. Preferred fluorides can be exemplified as KF.

(4) If the quantity of the electrolyte is small in relation to the positive electrode capacity, the internal resistance will rise, while if it is large, the oxygen generated in overcharging leads to fall off of the active material. The optimum quantity is 1.0 to 2.3 ml or so per Ah of the rated capacity. Noted is that since, in the nickel-cadmium storage battery, $H_2O$ is formed in charging and it is consumed in discharging, the quantity of the electrolyte fluctuates greatly. In such battery, it is preferable that the quantity is about 1.0 to 1.6 ml in the completely discharged state and approximately 1.6 to 2.7 ml in the completely charged state. It is also noted that in the nickel-metal hydride storage battery, there is a slight change in the quantity of the electrolyte attributable to the negative electrode. The optimum quantity of the electrolyte is 1.2 to 2.3 ml or so. From the above, in the sealed type alkaline storage battery, it is appropriate to use 1.0 to 2.7 ml of the electrolyte per Ah of the positive electrode capacity.

(5) In practice, furthermore, the formation of γ phase takes place in the region near oxygen-evolution potential, and even if the atmosphere temperature is not high (20° C.), the charging efficiency reduces by the competitive reaction with oxygen generation substantially. Therefore, it is very important to enhance the charging efficiency by increasing oxygen-evolution overvoltage.

For increasing the oxygen-evolution overvoltage, it is effective to incorporate the active material with Ca, Mg, Y, V, Cu, Ge, Zr, Nb, Mo, Ag, Zn, Cd, Sn, Sb, W, lanthanoids, etc. which work to raise the oxygen-evolution overvoltage. If those additive elements are incorporated, especially much on the surface of the active material, good results can be obtained.

The oxygen-evolution overvoltage can also be increased by arranging the powder of Ni, graphite, a Ca compound, a Ti compound, an Sr compound, a Ba compound, an Y compound, a Cd compound, Co, a Co compound, a Zn compound, a lanthanoid compound, etc. on the solid-liquid interface where oxygen generates, that is on the surface of the active material or near the surface of the electrode substrate. But too much addition of those compounds would lower the electrode capacity density because this would decrease the filled amount of active material, so that it is important to optimize the addition amount. The preferable range of addition is between 0.5 wt % to 12 wt % of the active material mixture.

In recent years, it is further desired that the secondary battery should exhibit sufficient characteristics under a variety of operating conditions, especially in a high temperature atmosphere. Since increasing the oxygen-evolution overvoltage to enhance the charging efficiency as mentioned above also improves the high temperature characteristics of the positive electrode, the above-mentioned measures are extremely useful.

(6) If an active material utilizing such a higher oxidized compound as mentioned above is used, the charging and discharging reaction is accompanied by intercalation and deintercalation of alkali ions and water molecules, and therefore it is essential to facilitate the circulation of the electrolyte and to increase the solid-liquid interface.

So, it is important to have the active material powder provided with a large number of micropores so as to enlarge the reaction area. Since, however, to effectively fill the active material into the electrode, it is essential that the density in the form of powder should be high, it is preferable that the active material powder should have a large number of micropores not larger than 200 angstroms or so in pore size and that the pores near the surface of powder are communicated with each other. The preferable powder is a powder having a large specific surface area of 5 to 50 $m^2/g$ in the BET specific surface area. To facilitate the circulation of the electrolyte, it is effective to increase the porosity of the electrode in the electrode structure to the extent that the capacity density will not drop drastically. Such a porosity is 15 to 35 vol %.

(7) It is also important to give a sufficient conductivity to the electrode. When the positive electrode active material is incorporated with other element in a solid solution state, the electric conductivity of the active material itself is observed to rise. However, if an electrode is made up by filling an active material in a two-dimensional or three-dimensional metallic porous substrate, it is important to compensate the electric conduction between the powders of the active material, and between the active material and the electrode substrate.

To impart a sufficient conductivity to the electrode, it is effective to provide the surface of the active material powder with a strong covering or network with a porous layer of a conductive metal oxide or metal to the extent that the reaction on the active material surface would not be hindered. Such a porous layer can be formed by filling into the electrode substrate $Co(OH)_2$ having a particle size of some 0.3 μm, for example, together with the active material powder, followed by aging after a battery is fabricated so as to hold it at the oxidation potential of Co.

But, if expansion and shrinking during charging and discharging are large as is the case with the positive electrode material used in the present invention due to the reaction between $\beta$-$Ni(OH)_2$ and $\gamma$-$NiOOH$, the active material easily falls off from the electrode as compared with the conventional active material, and therefore, it is important to prevent the fall off of the active material and maintain the electric conduction between the powders, and between the active material powders and the electrode substrate.

To maintain such a conductivity structure, therefore, it is effective to add to the inside of the positive electrode such binders as polyethylene, polytetrafluoroethylene, polystyrene, carboxylmethyl cellulose, methyl cellulose, polyvinyl alcohol, polyethylene oxide, styrene-butadiene rubber, etc. to the extent that the electrode capacity density is not decreased. It is also effective to cover the surface of the positive electrode with fluorocarbon resin so as to raise the mechanical strength of the electrode plate thereby preventing the active material from falling off as much as possible. Or, taking both measures is effective. The binder to be added to the positive electrode should be limited to 0.1 to 7 wt % of the weight of the active material in order to avoid a drastic decrease in the filled amount of active material.

Figure 2:
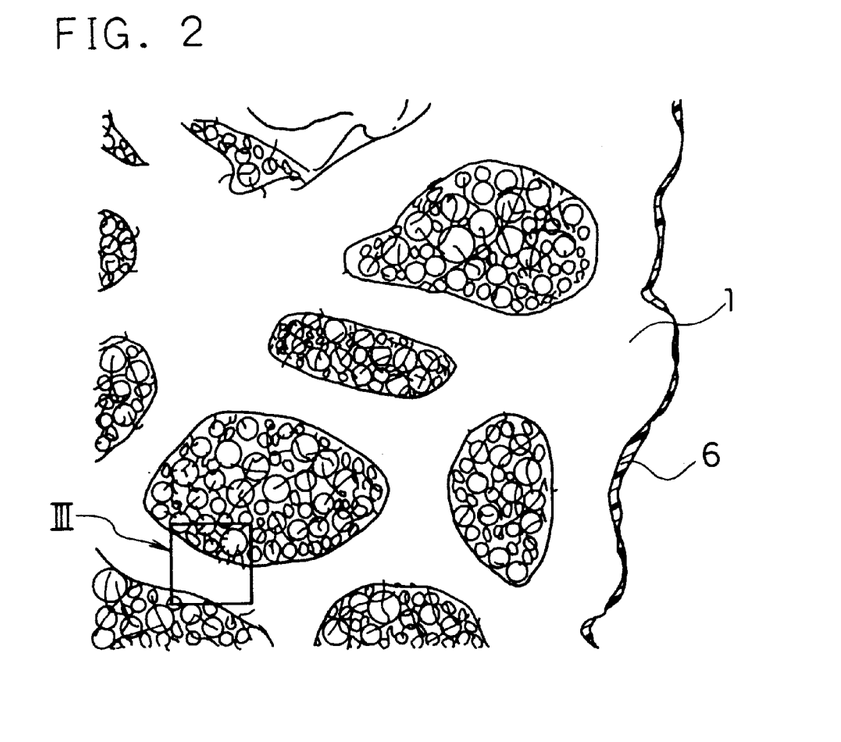
FIG. 2 is a typical view showing the essential part of the nickel positive electrode of the same.
Figure 3:
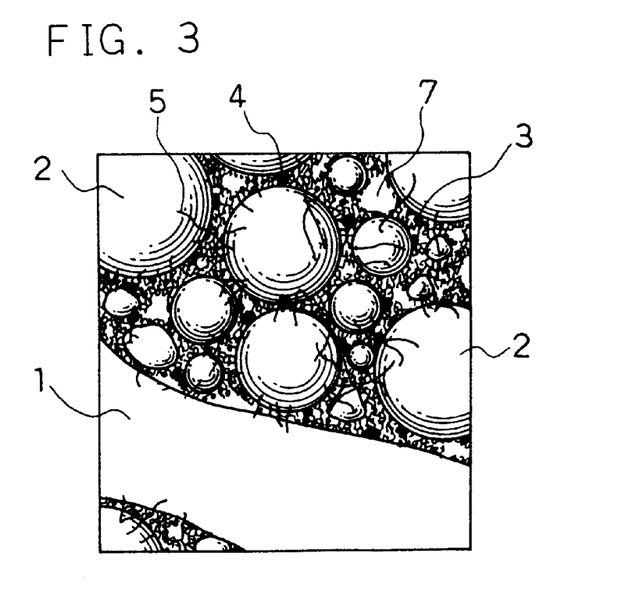
FIG. 3 is an enlarged view of the same.

Hereinafter, the mode for embodying the present invention will be described with reference to FIG. 1. FIG. 2 and FIG. 3.

Figure 1:
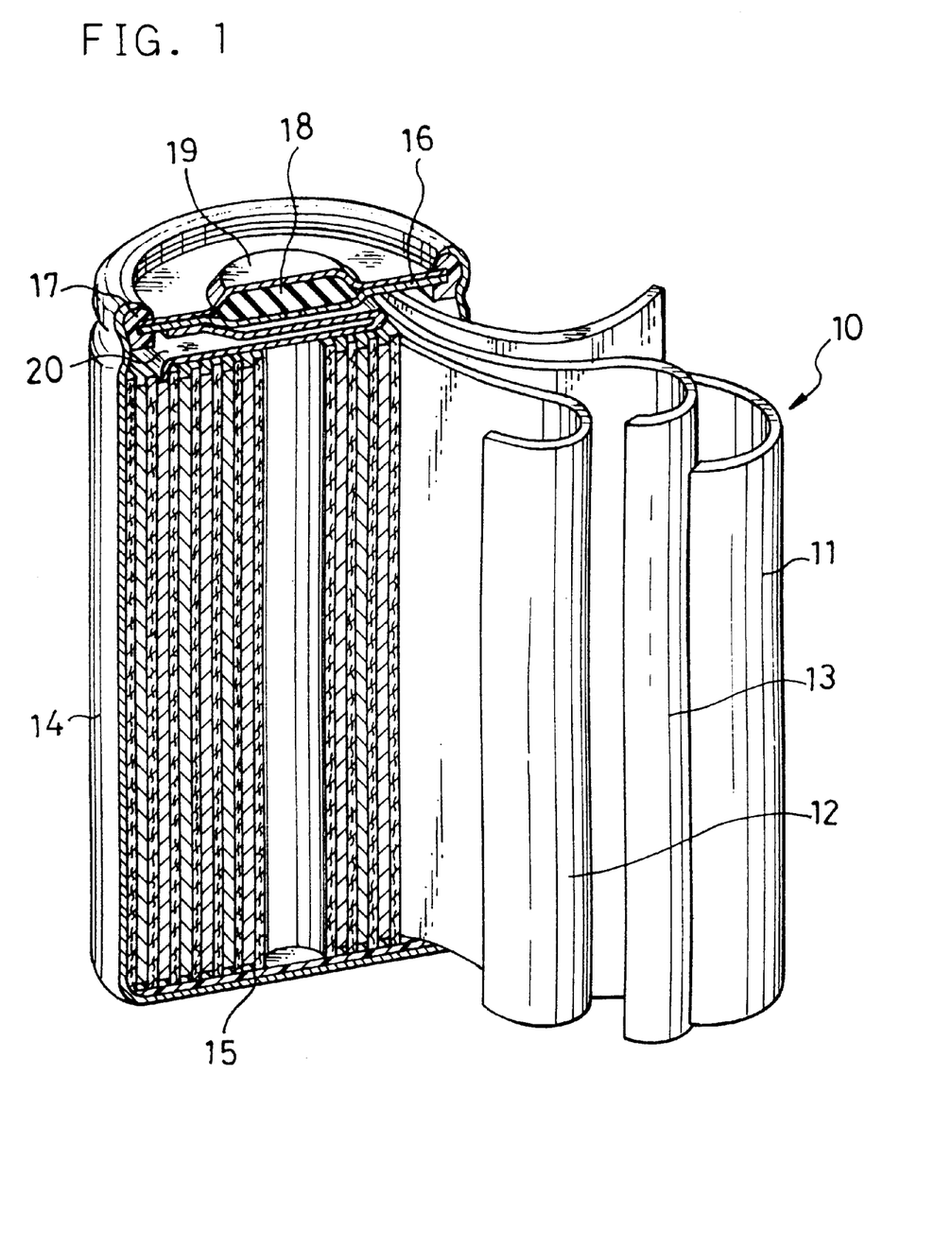
FIG. 1 is a perspective and partly broken view of an alkaline storage battery in one example of the present invention.

FIG. 1 shows a cylindrical type sealed nickel-metal hydride storage battery in one embodiment of the present invention. In FIG. 1, numeral 10 indicates an electrode group with a negative electrode plate 11, a positive electrode plate 12 and a separator 13 wound up in a spiral form. The negative electrode 11 is made of a hydrogen storage alloy $MmNi_{3.55}Co_{0.75}Mn_{0.4}Al_{0.3}$ as an active material. The positive electrode 12 is made of a nickel oxide as an active material. The electrolyte is prepared from an aqueous alkaline solution at a high concentration with $K^+$, $Na^+$ as main components. The separator 13, made of sulfonated polypropylene, separates the negative plate 11 and the positive plate 12. The electrode group 10, inserted in a battery case 14 made of nickel-plated steel, holds the electrolyte. The opening of the battery case 14 is sealed with a sealing plate 16 provided with a safety valve 18 between the sealing plate and a positive electrode terminal cap 19 and with a gasket 17. Numeral 15 is an insulating plate interposed between the electrode group 10 and the bottom of the battery case. Numeral 20 is a lead piece made of nickel connecting the positive electrode plate 12 with the sealing plate 16. The safety valve, if oxygen gas or hydrogen gas is generated within the battery, will release them out of the battery case, preventing the battery from exploding, and the valve actuating pressure is about 20 $kgf/cm^2$ or so.

In this example, the negative electrode is made of an MmNi-type $AB_5$ hydrogen storage alloy, but it is possible to carry out the present invention all the same using other $AB_5$ system hydrogen storage alloys like $LaNi_5$, $AB_2$ system hydrogen storage alloys like Zr—Ti—Mn—Ni system, $A_2B$ system hydrogen storage alloys like Mg—Ni system, or cadmium negative electrode or zinc negative electrode. A cylindrical sealed battery has been described here, but it is to be understood that a rectangular type sealed battery or a large-size sealed battery for electric vehicles or of the stationary type can also be embodied just the same.

FIG. 2 and FIG. 3 typically show an electrode composed of a foamed nickel substrate filled with an active material mixture as an example of the positive electrode according to the present invention. The substrate 1 is made of foamed nickel. The active material powder 2 is one prepared by depositing a solid solution nickel oxide incorporated with Ca in an atomic ratio of Ni:Ca=95:5 on the surface of solid solution nickel oxide particles incorporated with Mn in an atomic ratio of Ni:Mn=9:1. In order to achieve an electrode with a high capacity density, the particle of active material powder should preferably have a spherical shape, rather than irregular shape, since spherical shape powder is more easily filled into the substrate than the irregular shape powder. The tap density of such spherical powder should preferably be over 1.8 g/cm$^3$. The conductive porous layer 3 of porous CoOOH, placed on the surface of the active material powder and between the active material and the electrode substrate, works to compensate the electric conduction between the active material particles and between the active material and the substrate. An additive 4, which is responsible for raising the oxygen-evolution overvoltage and enhancing the charging efficiency especially at a high temperature, is $Y_2O_3$. A binder 5 added to the active material mixture and a fluorocarbon resin film 6 covering the surface of the electrode are both effective for preventing the fall off of the active material particles by expansion and shrinking. Numeral 7 indicates a void.

In the above illustration, the substrate is made of foamed nickel, but it is to be understood that embodiment is possible just the same with other three-dimensional metal porous substrates like nickel felt, two-dimensional metal porous plates like perforated metal, etc. It is also possible just the same using a nickel based multi-metals oxide incorporated with at least one metallic element selected from the group consisting of Mn, Al, Co, Cr, Fe, Zr and Bi.

Hereinafter, specific embodiments of the present invention will be described.

EXAMPLE 1

An aqueous mixed solution containing $NiSO_4$ 1.53 mol/l and $MnSO_4$ 0.17 mol/l, an aqueous solution of NaOH 8 mol/l and aqueous $NH_3$ 8.5 mol/l were prepared. The solutions were successively supplied to a reaction vessel at rates of 2.24 ml/min., 1 ml/min. and 1.06 ml/min., respectively, and stirred in the reaction vessel continuously. As a result, particles, which are reaction products, became to be produced constantly. Then, a suspension containing the particles which was consecutively discharged from the reaction vessel was collected and the particles were separated by decantation. The resultant was washed with water, dried, and then mixed with an aqueous solution of KOH 30 wt % at 50 g/l, and heated to 80° C. with stirring. It was then centrifuged, and the clear supernatant was substituted with ion exchanged water, followed by washing with water and drying. Thus, a powder having a mean particle size of 15 μm was obtained.

To 100 g of the nickel based oxide powder thus obtained, 10 g of $Co(OH)_2$ powder, 0.5 g of tetrafluoroethylene resin (hereinafter referred to as "PTFE") powder, 30 g of ethanol and 30 g of water were added and the mixture was kneaded to form a paste. This paste was filled into a foamed nickel substrate having a porosity of 95% and dried, and pressure-molded, thereby to obtain a nickel positive electrode plate having a thickness of 0.6 mm and a filling density of 600 mAh/cm$^3$. The capacity density of the nickel electrode given here was one calculated on the assumption that Ni in the active material undergoes one-electron reaction.

It is noted that spherical or roughly spherical particles are easier to fill into the foamed nickel substrate. Another point is that since the void in the foamed nickel substrate is some 100 μm in size, the particles to be filled should be preferably not larger than about 50 μm.

The positive electrode plate thus prepared was cut to a size of 39×86 mm, and dipped in an aqueous dispersion of tetrafluoroethylene-hexafluoropropylene copolymer powder and dried. Then, to a lead joint provided beforehand on the substrate an electrode lead was spot-welded, which gave a nickel positive electrode having a theoretical capacity of 1,200 mAh.

On the other hand, as a counter electrode used was a known negative electrode for alkaline storage batteries having a sufficiently larger capacity than that of the positive electrode. More specifically, a negative electrode made of a hydrogen storage alloy $MmNi_{3.55}Co_{0.75}Mn_{0.4}Al_{0.3}$ was used.

A mixture of Mm, Ni, Co, Mn and Al in a predetermined proportion was melted in an arc melting furnace, and a hydrogen storage alloy of the predetermined composition was obtained. This alloy ingot was mechanically pulverized into a powder having a particle size of 30 μm in an inert atmosphere. This was mixed with water and carboxylmethylcellulose as a binder and kneaded into a paste. This paste was filled under compression in an electrode support member to produce a hydrogen storage alloy negative electrode having a thickness of 0.45 mm and a capacity density of 1,350 mAh/cm$^3$. This negative electrode plate was cut to a size of 39×81 mm to obtain a negative electrode having a capacity of 1,920 mAh.

The above-mentioned positive electrode and negative electrode were put together into a spiral electrode group while interposing a separator of a sulfonated polypropylene nonwoven fabric having a thickness of 0.15 mm therebetween. This electrode group was inserted into a battery case, and after 2.2 ml of an aqueous solution of 10 mol/l KOH was poured into it, an opening part of the battery case was sealed with a sealing plate having a safety valve with an actuating valve pressure of 20 kgf/cm$^2$ to produce an AA size cylindrical sealed nickel-metal hydride storage battery.

COMPARATIVE EXAMPLE 1

An AA size cylindrical sealed nickel-metal hydride storage battery was made in the same way as in Example 1, except that an aqueous solution of 6 mol/l KOH was used as an electrolyte.

COMPARATIVE EXAMPLE 2

An electrode group made in the same way as in Example 1 was inserted into a battery case from which the bottom had been removed. This was dipped in 400 ml of an aqueous solution of 6 mol/l KOH and a vent type battery was made.

COMPARATIVE EXAMPLE 3

An aqueous mixed solution containing $NiSO_4$ 0.93 mol/l, $CoSO_4$ 0.02 mol/l and $ZnSO_4$ 0.05 mol/l, an aqueous solution of NaOH 2 mol/l and aqueous ammonia 2.1 mol/l were prepared and pumped continuously into a reaction vessel each at a rate of 1 ml/min, and stirred continuously, thereby to produce nickel hydroxide particles. Then a suspension containing the particles was collected and centrifuged. The supernatant of the precipitated particles obtained was substituted with ion exchanged water, followed by washing with water and drying. The resultant thus obtained (50 g) was mixed with 1 l of an aqueous solution of KOH 30 wt %, and heated to 80° C. with stirring, then washed with water and dried. Thus, a powder of $Ni(OH)_2$ containing Co and Zn and having a mean particle size of 15 μm was obtained. Except that this powder was used, an AA size cylindrical sealed nickel-metal hydride storage battery was fabricated in the same way as in Example 1.

COMPARATIVE EXAMPLE 4

An AA size cylindrical sealed nickel-metal hydride storage battery was made in the same way as in Example 1 using the powder of $Ni(OH)_2$ containing Co and Zn prepared in Comparative Example 3 and the electrolyte of KOH 6 mol/l as in Comparative Example 1.

The above batteries were each charged at a current of 120 mA for 20 hours at 20° C. and discharged at a current of 240 mA until the battery voltage was lowered to 1.0 V; this cycle of charging and discharging was repeated. The discharge capacity, measured after the discharge capacity became steady, was rounded down so that the last two digits were 00 or 50, which served as a constant capacity. In Examples and Comparative Examples given later, too, the rated capacities were determined similarly.

Figure 4:
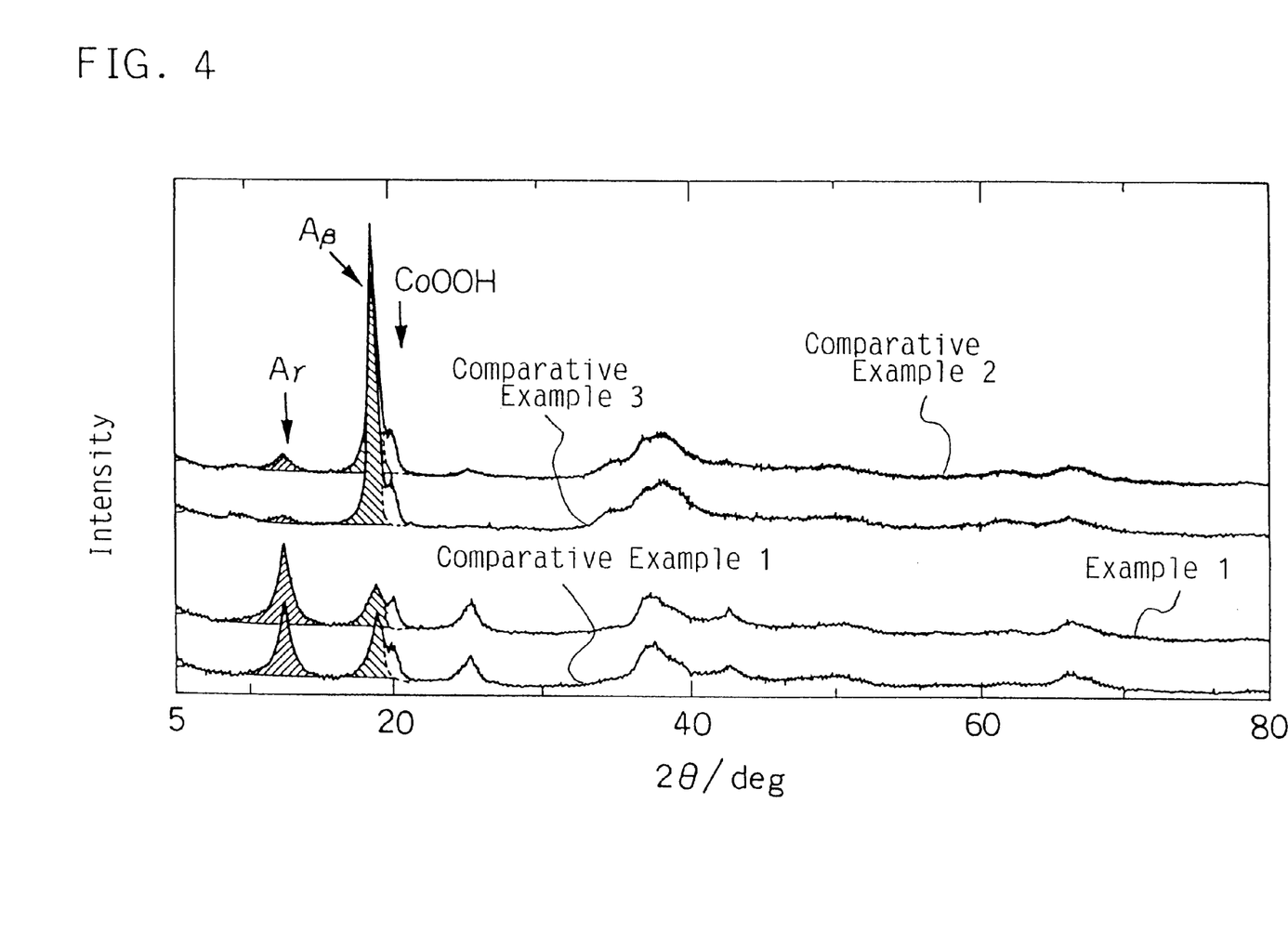
FIG. 4 is a view showing the X-ray diffraction patterns of different nickel oxides in the completely charged state.

The batteries of Example 1, Comparative Examples 1, 3 and 4 in the completely charged state were taken out of the nickel oxides of the positive electrodes. Powder X-ray diffraction patterns using Kα radiation of Cu were recorded for these nickel oxides. FIG. 4 shows the results. The battery of Example 1 is larger than the battery of Comparative Example 1 in the formation of γ phase. In Comparative Examples 3 and 4, on the other hand, little γ phase is formed.

Table 1 shows the rated capacities, electrolyte concentrations in the completely charged state and in the completely discharged state and the active material utilizations of the batteries of Example 1 and Comparative Examples 1 to 4. The utilizations of the active materials were determined from the discharge capacity when the battery was charged at 0.1° C. for 15 hours at 20° C. and then discharged at 0.2° C. until the battery voltage decreased to 1.0 V at 20° C.

TABLE 1

| Active material | Rated capacity (mAh) | KOH electrolyte concentration (mol/l) | | Active material utilization (%) |
| --- | --- | --- | --- | --- |
| | | Completely charged state | Completely discharged state | |
| Example 1 | 1500 | 4.7 | 9.8 | 127 |
| Comparative Example 1 | 1200 | 3.8 | 5.8 | 104 |
| Comparative Example 2 | 1450 | 6.0 | 6.0 | 122 |
| Comparative Example 3 | 1200 | 9.2 | 9.8 | 104 |
| Comparative Example 4 | 1200 | 5.4 | 5.7 | 98 |

As is evident from Table 1, a comparison of the batteries using an active material ready to form γ phase of Example 1 and Comparative Examples 1 and 2 indicates that Example 1 in which the electrolyte concentration in the completely charged state is not lower than 4 mol/l is far better than Comparative Example 1 in the utilization of the active material and is equal to or higher in the utilization of the active material than Comparative Example 2 where the electrolyte is used in a large quantity. Also noted is that Comparative Example 3 where the conventional γ phase formation-curbed active material is used is far lower than Example 1 in the utilization of the active material. The increased utilization of the active material by increasing the concentration of the electrolyte in Comparative Examples 3 and 4 is far smaller than in Example 1 and Comparative Example 1.

In the above examples, Mn was used as an additive element that gives such a nickel oxide as promotes the formation of γ phase in charging and causes the γ phase to quickly discharge within the range of the battery voltage. Among the additive elements that give the same results as Mn are Al, Co, Cr, Fe, Zr and Bi. If a solid solution nickel oxide incorporated with one or more selected from among them is used, the same results as above can be obtained.

Figure 5:
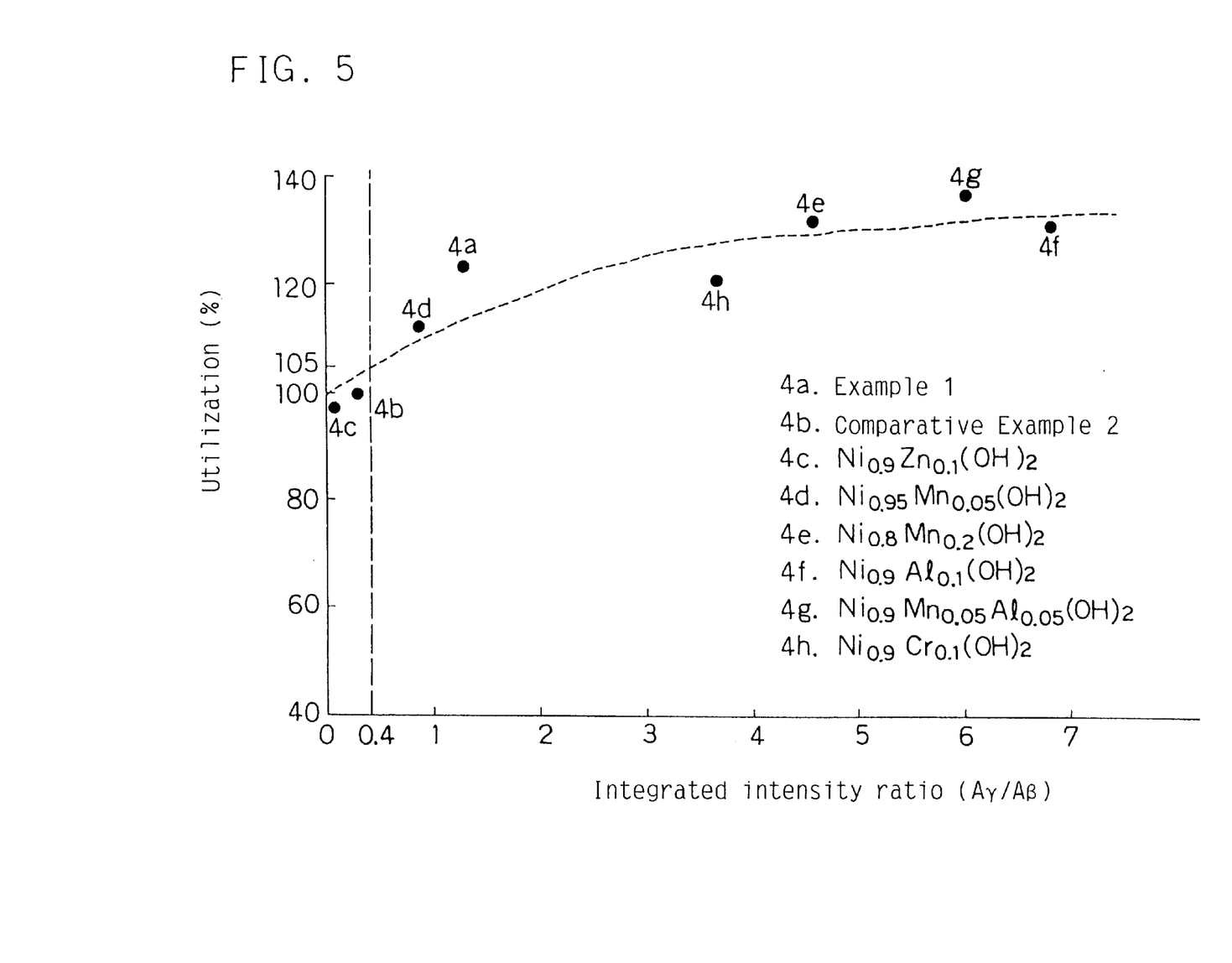
FIG. 5 is a view showing the relation between the active material utilizations and the $A_\gamma/A_\beta$ in the X-ray diffraction patterns of positive electrode active materials in the completely charged state of nickel-metal hydride storage batteries in which different nickel oxide active materials are used.

An examination was made for the utilizations of the active materials and the ratio $A_\gamma/A_\beta$ of the integrated intensity $A_\gamma$ of the diffraction peak at d=about 7 angstroms attributed to the γ phase to the integrated intensity $A_\beta$ of the diffraction peak at d=about 4.5 to 5.0 angstroms attributed to the β phase of the nickel oxide taken out from the positive electrode in the completely charged state of a cylindrical sealed nickel-metal hydride storage battery with a positive electrode using a solid solution nickel oxide incorporated with a number of elements selected from the group mentioned above. FIG. 5 shows the relation between $A_\gamma/A_\beta$ and the utilization of the active material. The dotted line in the figure indicates the values estimated from the measured values. It is clear from this that if an active material having the ratio $A_\gamma/A_\beta$ of the integrated intensity of not lower than 0.4 is used, a high utilization of the active material can be secured.

From the above, it follows that it is effective to use an active material having the integrated intensity ratio $A_\gamma/A_\beta$ of the X-ray diffraction peak of not lower than 0.4 in the completely charged state and to select a proper concentration of the electrolyte according to the battery design. The proper electrolyte concentration means that at least either of the following is satisfied: the total concentration of $K^+$ and $Na^+$ is 4 to 12 mol/l in the completely charged state or 8 to 14 mol/l in the completely discharged state.

EXAMPLE 2

An AA size cylindrical sealed nickel-metal hydride storage battery was made in the same way as in Example 1, except that an aqueous mixed solution containing KOH 7 mol/l, NaOH 3 mol/l and LiOH 0.5 mol/l was used as an electrolyte.

EXAMPLE 3

An aqueous solution of $NiSO_4$ and an aqueous solution of $Ca(NO_3)_2$ were each separately mixed with ethylenediamine tetraacetic acid (hereinafter referred to as "EDTA") to form a complex. The two solutions were mixed in a desired ratio, and the mixture was added with ion exchanged water and an aqueous solution of NaOH to adjust pH, which gave a mixed solution with pH=11.5 containing 0.95 mol/l and 0.05 mol/l of Ni and Ca, respectively, in the form of a complex. This mixture (1 l) was mixed with 50 g of a Co—, Mn— and Al-incorporated solid solution Ni(OH)$_2$ powder and heated to 80° C. while stirring. The suspension obtained was centrifuged, and after the supernatant was substituted with ion exchanged water, small crystals were removed by liquid classification, washed with water and dried. A spherical powder having a mean particle size of 17 μm was obtained. Except that this powder was used, an AA size cylindrical sealed nickel-metal hydride storage battery was made in the same way as in Example 1.

EXAMPLE 4

An AA size cylindrical sealed nickel-metal hydride storage battery was made in the same way as in Example 1, except that 0.7 g of Y$_2$O$_3$ powder was added to 100 g of the nickel based oxide powder in making a positive electrode in Example 1.

Table 2 shows the utilizations of the active materials when the batteries of Examples 1 to 4 and the batteries employing the Mn-incorporated solid solution nickel oxide positive electrode combined with different electrolyte compositions were discharged at 0.2° C. until the battery voltage decreased to 1.0 V at 20° C. after being charged at 0.1° C. for 15 hours at 20 or 45° C.

TABLE 2

| Active material | Composition of electrolyte | Active material utilization (%) Charged at 20° C. | Charged at 45° C. |
|---|---|---|---|
| Ni$_{0.9}$Mn$_{0.1}$(OH)$_2$ Example 1 | 10 mol/l KOH | 129 | 87 |
| Ni$_{0.9}$Mn$_{0.1}$(OH)$_2$ | 10 mol/l KOH + 0.5 mol/l LiOH | 132 | 94 |
| Ni$_{0.9}$Mn$_{0.1}$(OH)$_2$ | 10 mol/l NaOH | 126 | 91 |
| Ni$_{0.9}$Mn$_{0.1}$(OH)$_2$ | 7 mol/l KOH + 3 mol/l NaOH | 128 | 93 |
| Ni$_{0.9}$Mn$_{0.1}$(OH)$_2$ Example 2 | 7 mol/l KOH + 3 mol/l NaOH + 0.5 mol/l LiOH | 131 | 97 |
| Ni$_{0.9}$Mn$_{0.1}$(OH)$_2$ | 10 mol/l KOH + 0.02 mol/l CsOH | 134 | 86 |
| Ni$_{0.9}$Mn$_{0.1}$(OH)$_2$ | 10 mol/l KOH + 0.5 mol/l RbOH | 134 | 88 |
| Example 3 | 10 mol/l KOH | 128 | 95 |
| Example 4 | 10 mol/l KOH | 127 | 98 |

As is clear from Table 2, the charging efficiency can be raised by optimizing the electrolyte composition. It is shown that especially the electrolyte containing NaOH or LiOH has a marked effect on the improvement of the charging efficiency at a high temperature. It is also evident that the battery of Example 3 where the Ca-incorporated solid solution nickel oxide is used as the positive electrode active material and the battery of Example 4 where Y$_2$O$_3$ is added to the positive electrode active material mixture are improved in charging efficiency at a high temperature.

COMPARATIVE EXAMPLE 5

An AA size cylindrical sealed nickel-metal hydride storage battery was made in the same way as in Example 1, except that Co(OH)$_2$ was not added in making the positive electrode.

COMPARATIVE EXAMPLE 6

An AA size cylindrical sealed nickel-metal hydride storage battery was made in the same way as in Example 1, except that PTFE was not added in making the positive electrode.

COMPARATIVE EXAMPLE 7

An AA size cylindrical sealed nickel-metal hydride storage battery was made in the same way as in Example 1, except that dipping in an aqueous dispersion of fluorocarbon resin powder was omitted in making the positive electrode.

Figure 6:
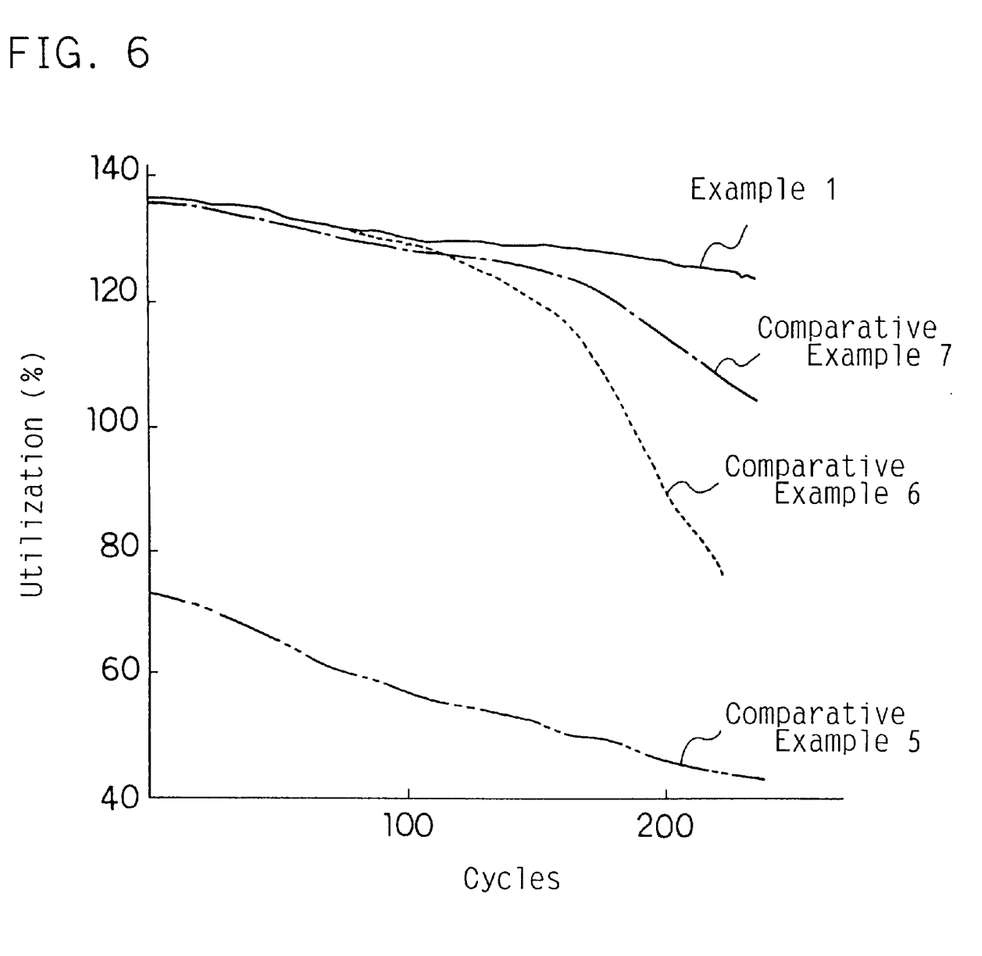
FIG. 6 is a view comparing the changes in active material utilization with charging and discharging cycles of batteries of Example 1 and Comparative Examples 5 to 7.

The batteries of Example 1 and Comparative Examples 5 to 7 were charged at 0.1° C. for 15 hours at 20° C. and discharged at 0.2° C. until the battery voltage decreased to 1.0 V; this cycle of charging and discharging was repeated. FIG. 6 shows the changes in the utilizations of the active materials with the progress of charge and discharge cycles. As is clear from FIG. 6, Comparative Example 5 in which a positive electrode without Co(OH)$_2$ is used forms no conductive CoOOH porous layer near the surface of the active material powder and poor in electric conduction between the powders of the active material and between the active material and the substrate, and is much inferior to Example 1 in discharge characteristics. It is also shown that in Comparative Example 6 where a positive electrode with no PTFE was used and Comparative Example 7 of which positive electrode was not dipped in the dispersion of fluorocarbon resin powder, the active material falls off as the active material expands and shrinks, and is inferior to Example 1 in cycle characteristics.

EXAMPLE 5

An aqueous mixed solution containing NiSO$_4$ 1.445 mol/l, MnSO$_4$ 0.17 mol/l and Al$_2$(SO$_4$)$_3$ 0.0425 mol/l, an aqueous solution of NaOH 8 mol/l and aqueous NH$_3$ 8.5 mol/l were prepared and pumped continuously into a reaction vessel at rates of 2.24 ml/min., 1 ml/min. and 1.06 ml/min., respectively, and stirred continuously, thereby to produce nickel hydroxide particles. Then a suspension containing the particles which was consecutively discharged from the reaction vessel were collected and separated by decantation. The resultant was washed with water, dried, and then mixed with an aqueous solution of KOH 30 wt % at 50 g/l, and heated to 80° C. with stirring. It was then centrifuged, and the clear supernatant was substituted with ion exchanged water, followed by washing with water and drying. Thus, a powder having a mean particle size of 15 μm was obtained. A nickel positive electrode having a theoretical capacity of 1,200 mAh was made in the same way as in Example 1, except that this powder was used. For the negative electrode, used was the hydrogen storage alloy negative electrode plate used in Example 1, cut to a size of 39×93 mm having a capacity of 2,200 mAh. These positive electrode and negative electrode were put together into a spiral electrode group while interposing a separator of a sulfonated polypropylene nonwoven fabric having a thickness of 0.15 mm therebetween. This electrode group was inserted into a battery case. After 1.8 ml of an aqueous solution of NaOH 10 mol/l was poured into it, an opening part of the battery case was sealed with a sealing plate having a safety valve with an actuating valve pressure of 20 kgf/cm$^2$ to produce an AA size cylindrical sealed nickel-metal hydride storage battery.

COMPARATIVE EXAMPLE 8

An AA size cylindrical sealed nickel-metal hydride storage battery was made in the same way as in Example 5, except that an aqueous solution of NaOH 15 mol/l was used as an electrolyte.

COMPARATIVE EXAMPLE 9

An AA size cylindrical sealed nickel-metal hydride storage battery was made in the same way as in Example 5, except that an aqueous solution of NaOH 8 mol/l was used as an electrolyte.

Table 3 shows the rated capacities, electrolyte concentrations in the completely charged state and in the completely discharged state and the active material utilizations of the batteries of Example 5 and Comparative Example 9. The utilizations of the active materials were determined from the discharge capacity when the battery charged at 0.1° C. for 15 hours at 20° C. and was discharged at 0.2° C. until the battery voltage decreased to 1.0 V.

TABLE 3

| Active material | Rated capacity (mAh) | NaOH electrolyte concentration (mol/l) | | Active material utilization (%) |
|---|---|---|---|---|
| | | Completely charged state | Completely discharged state | |
| Example 5 | 1400 | 3.8 | 8.4 | 119 |
| Comparative Example 9 | 1250 | 4.3 | 7.2 | 107 |

As is evident from Table 3, the battery of Example 5 in which the concentration of the electrolyte in the completely discharged state is not lower than 8 mol/l is far improved in the utilization of the active material over the battery of Comparative Example 9 in which the concentration of the electrolyte in the completely discharged state is less than 8 mol/l.

It should be noted that while the battery of Comparative Example 8 showed an active material utilization of 124% in the initial stage of rated capacity measurement, the discharge capacity dropped sharply and the active material utilization fell to below 90% after 10 cycles, and the measurement was discontinued.

EXAMPLE 6

The positive electrode made in the same way as in Example 1 was used. After this positive electrode plate was cut to a size of 39×71.2 mm, it was immersed in an aqueous dispersion of fluorocarbon resin powder and dried. And to a lead joint provided beforehand on the substrate, an electrode lead was spot-welded, which gave a nickel positive electrode having a theoretical capacity of 1,000 mAh. As a counter electrode a known cadmium negative electrode was prepared. Cadmium oxide, polyethylene powder and acrylic resin fiber were mixed in a proportion of 98:1.5:0.5 by weight, and it was mixed with ethylene glycol and kneaded into a paste, which was coated over a perforated metal substrate. This was subjected to a formation in an aqueous solution of KOH 6 mol/l to convert 12 weight % of Cd content into metallic cadmium. This negative plate was cut to a size of 39×101.2 mm to make a negative electrode having a thickness of 0.6 mm and a capacity of 2,840 mAh. The positive electrode and negative electrode were put together into a spiral electrode group while interposing a separator of a sulfonated polypropylene nonwoven fabric having a thickness of 0.15 mm therebetween. After this electrode group was inserted into a battery case, 1.4 ml of an aqueous solution of KOH 13 mol/l was poured into it and an opening part of the battery case was sealed with a sealing plate having a safety valve with an actuating valve pressure of 20 kgf/cm$^2$ to produce an AA size cylindrical sealed nickel-cadmium storage battery.

COMPARATIVE EXAMPLE 10

An AA size cylindrical sealed nickel-cadmium storage battery was made in the same way as in Example 6, except that an aqueous solution of KOH 8.5 mol/l was used as an electrolyte.

COMPARATIVE EXAMPLE 11

An AA size cylindrical sealed nickel-cadmium storage battery was made in the same way as in Comparative Example 10, except that the positive electrode was made using a Ni(OH)$_2$ powder having a mean particle size of 15 μm containing Co and Zn which had been prepared in Comparative Example 3 and that a KOH electrolyte 9.95 mol/l was used as an electrolyte.

COMPARATIVE EXAMPLE 12

An AA size cylindrical sealed nickel-cadmium storage battery was made in the same way as in Comparative Example 11, except that a KOH electrolyte 8.5 mol/l was used.

Table 4 shows the rated capacities, electrolyte concentrations in the completely charged state and in the completely discharged state and the active material utilizations of the batteries of Example 6 and Comparative Examples 10 to 12, the utilizations of the active materials determined after the batteries were charged at 0.1° C. for 15 hours at 20° C. and discharged at 0.2° C. until the battery voltage decreased to 1.0 V. As is clear from Table 4, the battery of Example 6 in which the electrolyte concentration in the completely charged state is not lower than 4 mol/l is improved in the utilization of the active material over the battery of Comparative Example 10. Also as is evident from Comparative Examples 11 and 12, the batteries using the conventional positive electrode active material in which the formation of γ phase is suppressed are lower than the improved positive electrode in the improvement of the active material utilization in spite of the use of a high concentration of the electrolyte.

TABLE 4

| Active material | Rated capacity (mAh) | KOH electrolyte concentration (mol/l) | | Active material utilization (%) |
|---|---|---|---|---|
| | | Completely charged state | Completely discharged state | |
| Example 6 | 1350 | 4.3 | 12.5 | 115 |
| Comparative Example 10 | 1250 | 3.2 | 8.1 | 108 |
| Comparative Example 11 | 1200 | 8.4 | 12.6 | 99 |
| Comparative Example 12 | 1200 | 4.9 | 8.2 | 97 |

According to the present invention, the utilization of the positive electrode active material can be raised and the energy density in a sealed battery where the quantity of the electrolyte is limited can be substantially improved. An alkaline storage battery with an excellent energy density is provided.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An alkaline storage battery comprising a positive electrode having as a main material an active material of a nickel based multi-metals oxide containing at least one element selected from the group consisting of Mn, Al, Co, Cr, Fe, Zr and Bi, a negative electrode, a separator and 1.0 to 2.7 ml of an electrolyte per Ah of the positive electrode capacity, wherein said nickel based multi-metals oxide reversibly cycles between the β(II)-phase and the γ(III)-phase during charge/discharge cycling of the battery and said nickel based multi-metals oxide in its completely charged state has a γ phase having a diffraction peak at an interlayer spacing d of about 7 angstroms in the powder x-ray diffraction, the ratio $A_\gamma/A_\beta$ of the integrated intensity $A_\gamma$ of the diffraction peak at d=about 7 angstroms attributed to the γ phase to the integrated intensity $A_\beta$ of the diffraction peak at d=about 4.5 to 5.0 angstroms attributed to the β phase of said nickel based multi-metals oxide in its completely charged state is not smaller than 0.4, said electrolyte comprises an aqueous solution containing at least one of $K^+$ and $Na^+$ as a cationic component, and the total concentration of said cationic component in said electrolyte in the completely charged state is within a range between 4 and 12 mol/l.

2. An alkaline storage battery in accordance with claim 1, wherein the total concentration of said cationic component in said electrolyte in the completely discharged state is within a range between 8 and 14 mol/l.

3. The alkaline storage battery in accordance with claim 1, wherein said electrolyte contains $K^+$ and $Na^+$ and the content of $Na^+$ is within a range between 10 and 60 mol % of the total concentration of $K^+$ and $Na^+$ in said electrolyte.

4. The alkaline storage battery in accordance with claim 1, wherein said electrolyte contains at least one selected from the group consisting of $Li^+$, $Rb^+$ and $Cs^+$ in a content ranging from 0.02 to 1 mol/l.

5. The alkaline storage battery in accordance with claim 1, wherein said electrolyte further contains at least one of a neutral salt and a fluoride of an alkali metal, said neutral salt being at least one selected from the group consisting of a carbonate, a nitrate, a sulfate, a thiosulfate and an acetate.

6. The alkaline storage battery in accordance with claim 1, wherein said nickel based multi-metals oxide further contains at least one element selected from the group consisting of Ca, Mg, Y, V, Cu, Ge, Zr, Nb, Mo, Ag, Zn, Cd, Sn, Sb, W and lanthanoids.

7. The alkaline storage battery in accordance with claim 1, wherein said nickel based multi-metals oxide is a powder having a BET specific surface area of 5 to 50 $m^2/g$.

8. The alkaline storage battery in accordance with claim 1, wherein said positive electrode has a porosity of 15 to 35 vol %.

9. The alkaline storage battery in accordance with claim 1, wherein said nickel based multi-metals oxide is a powder coated with a conductive porous layer of a metal oxide or metal mainly on the surface of the powder.

10. The alkaline storage battery in accordance with claim 1, wherein said positive electrode comprises a conductive substrate and an active material mixture supported on said conductive substrate, and said active material mixture comprises said nickel based multi-metals oxide and at least one selected from the group consisting of Ni, graphite, a Ca compound, a Ti compound, a Sr compound, a Ba compound, an Y compound, a Cd compound, Co, a Co compound, a Zn compound and a lanthanoid metal compound.

11. An alkaline storage battery comprising a positive electrode having as a main material an active material of a nickel based multi-metals oxide containing at least one element selected from the group consisting of Mn, Al, Co, Cr, Fe, Zr and Bi, a negative electrode, a separator and 1.0 to 2.7 ml of an electrolyte per Ah of the positive electrode capacity, wherein said nickel based multi-metals oxide reversibly cycles between the β(II)-phase and the γ(III)-phase during charge/discharge cycling of the battery, and said nickel-based multi-metals oxide in its completely charged state has a γ phase having a diffraction peak at an interlayer spacing d of about 7 angstroms in the powder x-ray diffraction, the ratio of $A_\gamma/A_\beta$ of the integrated intensity $A_\gamma$ of the diffraction peak at d=about 7 angstroms attributed to the γ phase to the integrated intensity $A_\beta$ of the diffraction peak at d=about 4.5 to 5.0 angstroms attributed to the β phase of said nickel based multi-metals oxide in its completely charged state is not smaller than 0.4, said electrolyte comprises an aqueous solution containing at least one of $K^+$ and $Na^+$ as a cationic component, and the total concentration of said cationic component in said electrolyte in the completely discharged state is within a range between 8 and 14 mol/l.

12. The alkaline storage battery in accordance with claim 11, wherein said electrolyte contains $K^+$ and $Na^+$ and the content of $Na^+$ is within a range between 10 and 60 mol % of the total concentration of $K^+$ and $Na^+$ in said electrolyte.

13. The alkaline storage battery in accordance with claim 11, wherein said electrolyte contains at least one selected from the group consisting of $Li^+$, $Rb^+$ and $Cs^+$ in a content ranging from 0.02 to 1 mol/l.

14. The alkaline storage battery in accordance with claim 11, wherein said electrolyte further contains at least one of a neutral salt and a fluoride of an alkali metal, said neutral salt being at least one selected from the group consisting of a carbonate, a nitrate, a sulfate, a thiosulfate and an acetate.

15. The alkaline storage battery in accordance with claim 11, wherein said nickel based multi-metals oxide further contains at least one element selected from the group consisting of Ca, Mg, Y, V, Cu, Ge, Zr, Nb, Mo, Ag, Zn, Cd, Sn, Sb, W and lanthanoids.

16. The alkaline storage battery in accordance with claim 11, wherein said nickel based multi-metals oxide is a powder having a BET specific surface area of 5 to 50 $m^2/g$.

17. The alkaline storage battery in accordance with claim 11, wherein said positive electrode has a porosity of 15 to 35 vol %.

18. The alkaline storage battery in accordance with claim 11, wherein said nickel based multi-metals oxide is a powder coated with a conductive porous layer of a metal oxide or metal mainly on the surface of the powder.

19. The alkaline storage battery in accordance with claim 11, wherein said positive electrode comprises a conductive substrate and an active material mixture supported on said conductive substrate, and said active material mixture comprises said nickel based multi-metals oxide and at least one selected from the group consisting of Ni, graphite, a Ca compound, a Ti compound, a Sr compound, a Ba compound, an Y compound, a Cd compound, Co, a Co compound, a Zn compound and a lanthanoid metal compound.

20. An alkaline storage battery comprising a positive electrode having as a main material an active material of a nickel based multi-metals oxide containing at least one element selected from a group consisting of Mn, Al, Co, Cr, Fe, Zr and Bi, a negative electrode, a separator and 1.0 to 2.7 ml of an electrolyte per Ah of the positive electrode capacity, wherein said nickel based multi-metals oxide reversibly cycles between the β(II)-phase and the γ(III)-phase during charge/discharge cycling of the battery, wherein said electrolyte comprises an aqueous solution containing at least one of $K^+$ and $Na^+$ as a cationic component, and the total concentration of said cationic component in said electrolyte in the completely charged state is within a range between 4 and 12 mol/l.

21. The alkaline storage battery in accordance with claim 20, wherein said electrolyte contains $K^+$ and $Na^+$ and the content of $Na^+$ is within a range between 10 and 60 mol % of the total concentration of $K^+$ and $Na^+$ in said electrolyte.

22. The alkaline storage battery in accordance with claim 20, wherein said electrolyte contains at least one selected from the group consisting of $Li^+$, $Rb^+$ and $Cs^+$ in a content ranging from 0.02 to 1 mol/l.

23. The alkaline storage battery in accordance with claim 20, wherein said nickel based multi-metals oxide further contains at least one element selected from the group consisting of Ca, Mg, Y, V, Cu, Ge, Zr, Nb, Mo, Ag, Zn, Cd, Sn, Sb, W and lanthanoids.

24. An alkaline storage battery comprising a positive electrode having as a main material an active material of a nickel based multi-metals oxide containing at least one element selected from a group consisting of Mn, Al, Co, Cr, Fe, Zr and Bi, a negative electrode, a separator and 1.0 to 2.7 ml of an electrolyte per Ah of the positive electrode capacity, wherein said nickel based multi-metals oxide reversibly cycles between the $\beta(II)$-phase and the $\gamma(III)$-phase during charge/discharge cycling of the battery, wherein said electrolyte comprises an aqueous solution containing at least one of $K^+$ and $Na^+$ as a cationic component, and the total concentration of said cationic component in said electrolyte in the completely discharged state is within a range between 8 and 14 mol/l.

25. The alkaline storage battery in accordance with claim 24, wherein said electrolyte contains $K^+$ and $Na^+$ and the content of $Na^+$ is within a range between 10 and 60 mol % of the total concentration of $K^+$ and $Na^+$ in said electrolyte.

26. The alkaline storage battery in accordance with claim 24, wherein said electrolyte contains at least one selected from the group consisting of $Li^+$, $Rb^+$ and $Cs^+$ in a content ranging from 0.02 to 1 mol/l.

27. The alkaline storage battery in accordance with claim 24, wherein said nickel based multi-metals oxide further contains at least one element selected from the group consisting of Ca, Mg, Y, V, Cu, Ge, Zr, Nb, Mo, Ag, Zn, Cd, Sn, Sb, W and lanthanoids.

* * * * *